Patented May 25, 1943

2,320,322

UNITED STATES PATENT OFFICE 2,320,322

PROCESS OF SEPARATING 2,4 LUTIDINE AND 2,5 LUTIDINE

Francis E. Cislak, Indianapolis, and Orin D. Cunningham, Speedway City, Ind., assignors to Reilly Tar & Chemical Corporation, Indianapolis, Ind., a corporation of Indiana No Drawing. Application June 12, 1942, Serial No. 446,844

12 Claims. (Cl. 260—290)

Our invention relates to the separation of 2,4-lutidine and 2,5-lutidine from each other.

These two compounds, 2,4-lutidine and 2,5-lutidine, are commonly associated with each other as ordinarily prepared from coal tar. But they are difficult to separate one from each other, because their properties are closely alike; especially their boiling points, so that separating them by fractional distillation is very difficult. These two compounds boil at very nearly the same temperature—about 157-158° C.

We have found, contrary to what might be expected, that the hydrohalides of 2,4-lutidine and 2,5-lutidine are distillable; that if in a mixture of these compounds we convert them into their respective hydrohalides, we obtain a fairly wide separation of boiling points; and that the resultant mixture of these hydrohalides is readily separable by fractional distillation on account of that relatively large difference in boiling points. After that separation, the separated hydrohalides may if desired be separately reconverted in any suitable manner into the bases from which they were derived, as by treatment with an alkali-metal hydroxide or ammonia.

The relatively wide difference in the boiling points of the hydrohalides is exemplified by the hydrochlorides, the most convenient ones to use. These are about as follows:

2,4-lutidine hydrochloride, approximately 251° C.
2,5-lutidine hydrochloride, approximately 245° C.

The boiling points of the two hydrofluorides, the two hydrobromides, and the two hydroiodides, differ between themselves in much the same manner; and in each case materially more widely than do the boiling points of the two bases.

By our process we can readily separate mixtures of these two bases. Such a mixture is treated with a hydrogen halide, to convert both bases into their hydrohalides; then the mixture of hydrohalides is subjected to fractional distillation, to separate the component hydrohalides by reason of their aforesaid difference in boiling points; and then, if desired, either or both of the separated hydrohalides may be reconverted into the bases from which they came, in any suitable manner.

The equipment, and more especially the still and the fractionating column, should be resistant to the attack of the hydrohalides.

In converting the mixture of bases into the hydrohalides, we may use either aqueous solutions of the desired hydrogen halides, or the hydrogen halides themselves. For instance, if we convert the bases into hydrochlorides, which are the halides we prefer for convenience, we may treat the mixture of bases with aqueous hydrochloric acid, or may bubble gaseous hydrogen chloride through such a mixture.

The following are examples of our process.

Example 1: 428 gms. (4.0 moles) of a mixture containing 2,4-lutidine and 2,5-lutidine is reacted with 144 gms. (4.0 moles) of hydrogen chloride to produce a mixture of the hydrochlorides of 2,4-lutidine and 2,5-lutidine. This mixture of hydrochlorides is subjected to fractional distillation, through an efficient fractionating column, to obtain first the 2,5-lutidine hydrochloride boiling at about 245° C. and later the 2,4-lutidine hydrochloride boiling at about 251° C. These separated hydrochlorides, or either of them, may be separately treated to reconstitute the respective bases, 2,4-lutidine and 2,5-lutidine, in any convenient manner, most conveniently by treatment with caustic soda. If conveniently by treatment with caustic soda. If caustic soda is used, it is desirably fairly concentrated, say about 50% or more. The freed separated lutidines thus obtained are usually of a purity of 80% or better for both the 2,4-lutidine and the 2,5-lutidine.

Example 2: Example 1 is repeated, save that instead of using 4 moles of hydrogen chloride we use 4 moles of hydrogen-bromide.

Example 3: Example 1 is repeated, save that instead of using hydrogen chloride we use hydrogen iodide.

Example 4: Example 1 is repeated, save that instead of using hydrogen chloride we us hydrogen fluoride.

In the foregoing examples we have contemplated using a fractionating column of rather high efficiency. But the difference in boiling points between the different hydrohalides of 2,4-lutidine and 2,5-lutidine is sufficient that high efficiency in a fractionating column is not essential if high purity of the separated components is not important. Indeed, the difference in boiling points is such that fair separation can be obtained in ordinary distillation apparatus.

We claim as our invention:

1. The process of separating a mixture containing the bases 2,4-luitdine and 2,5-lutidine, which consists in converting the bases in the mixture into their hydrohalides, and separating the hydrohalides by fractional distillation.

2. The process of separating a mixture containing the bases 2,4-lutidine and 2,5-lutidine, which consists in converting the bases in the mixture into their hydrohalides, separating the hydrohalides by fractional distillation, and reconverting the separated hydrohalides into the respective bases from which they were derived.

3. In the process of obtaining the separate components of a mixture containing the bases 2,4-lutidine and 2,5-lutidine, the step of fractionally distilling a mixture of the hydrohalides of said bases.

4. The process as set forth in claim 1, in which the hydrohalides into which the bases are converted are hydrochlorides.

5. The process as set forth in claim 2, in which the hydrohalides into which the bases are converted are hydrochlorides.

6. The process step as set forth in claim 3, in which the hydrohalides which are distilled are hydrochlorides.

7. The process as set forth in claim 1, in which the hydrohalides into which the bases are converted are hydrobromides.

8. The process as set forth in claim 2, in which the hydrohalides into which the bases are converted are hydrobromides.

9. The process step as set forth in claim 3, in which the hydrohalides which are distilled are hydrobromides.

10. The process as set forth in claim 1, in which the hydrohalides into which the bases are converted are hydrofluorides.

11. The process as set forth in claim 2, in which the hydrohalides into which the bases are converted are hydrofluorides.

12. The process step as set forth in claim 3, in which the hydrohalides which are distilled are hydrofluorides.

FRANCIS E. CISLAK.
ORIN D. CUNNINGHAM.